W. A. SPARKS.
WELDING TOOL.
APPLICATION FILED AUG. 27, 1906.
940,903.
Patented Nov. 23, 1909.
2 SHEETS—SHEET 1.
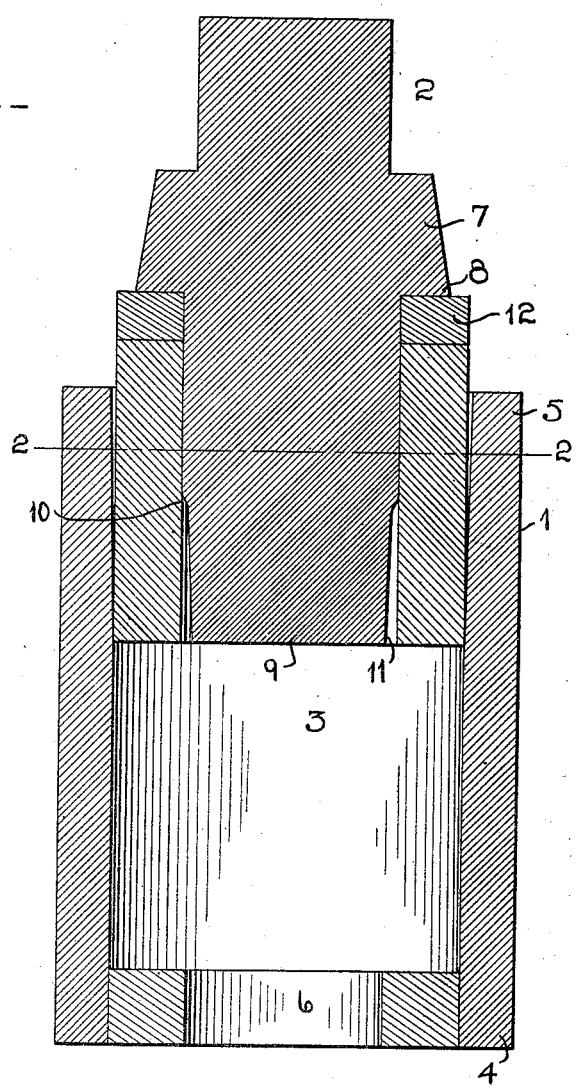
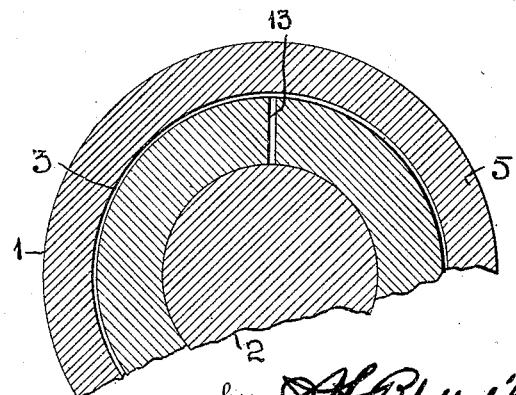
Witnesses
L. B. James
C. H. Griesbauer
Inventor
W. A. Sparks
by H. B. Willson &co
Attorneys

W. A. SPARKS.
WELDING TOOL.
APPLICATION FILED AUG. 27, 1906.

940,903.

Patented Nov. 23, 1909.
2 SHEETS—SHEET 2.

Witnesses

Inventor
W. A. Sparks
by
Attorneys

UNITED STATES PATENT OFFICE.

WILLIAM A. SPARKS, OF ST. MARYS, WEST VIRGINIA.

WELDING-TOOL.

940,903.

Specification of Letters Patent.   Patented Nov. 23, 1909.

Application filed August 27, 1906.   Serial No. 332,164.

*To all whom it may concern:*

Be it known that I, WILLIAM A. SPARKS, a citizen of the United States, residing at St. Marys, in the county of Pleasants and State of West Virginia, have invented certain new and useful Improvements in Welding-Tools; and I do declare the following to be a full, clear, and exact description of the invention, such as will enable others skilled in the art to which it appertains to make and use the same.

My invention relates to improvements in tools for forging and welding bands, collars, bushings, drive shoes, boiler bottoms, packers, steel nipples and other cylindrical or approximately cylindrical work, and it consists in the construction and combination of devices hereinafter described and claimed.

Figure 3:
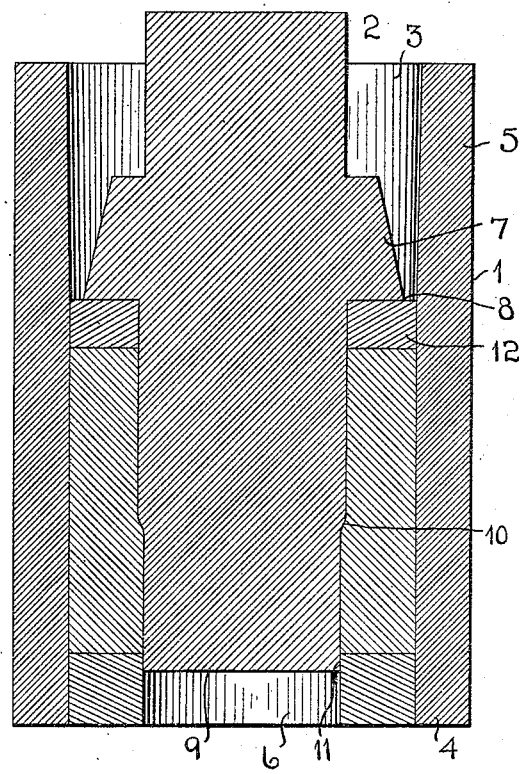
Figure 4:
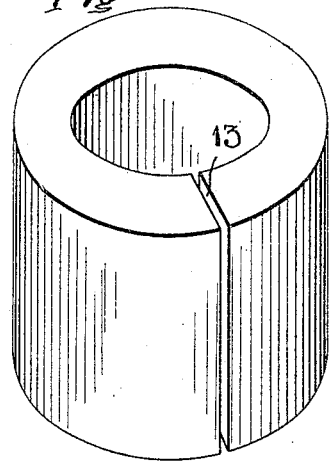
Figure 5:
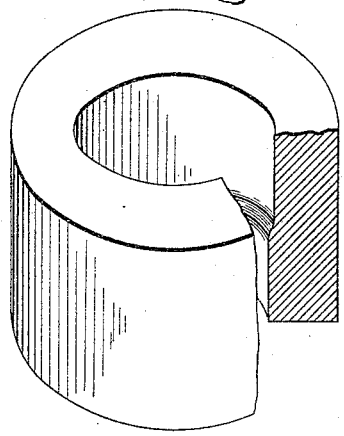

In the accompanying drawings;—Figure 1 is a vertical sectional view of a welding tool embodying my invention, showing the mandrel and the work in an initial position; Fig. 2 is a sectional view of the same taken on the plane indicated by the line 2—2 of Fig. 1; Fig. 3 is a vertical sectional view, showing the mandrel in its final position and the work finished; Fig. 4 is a detail perspective view of the work when in the form of an open cylinder ready for forging and welding by the tool; and Fig. 5 is a similar view of the work after having been forged and welded by the tool.

My improved forging and welding tool consists essentially of a die or former 1 and a mandrel 2. The shapes of the die and mandrel will be varied according to the required form of the articles to be forged and welded thereby. As here shown, they are of suitable form to enable them to forge and weld bushings of plain cylindrical outer form and of cylindrical inner form, reduced at one end.

The die 1 is here shown as of cylindrical outer form, and as having a bore 3, the lower portion 4 of which is cylindrical and the upper portion 5 of which is flared, so that it tapers downwardly. In the lower portion of the bore of the die or former is placed a false ring 6.

The mandrel 2 has a head 7 forming an overhang and an annular shoulder 8. The lower portion 9 of the mandrel is cylindrical in form to impart the required shape to the interior of the work and its lower end is shouldered as at 10 and reduced as at 11. A false ring 12 placed on the mandrel, directly under and bearing against the shoulder 8 extends laterally therebeyond to form a striking or hammering ledge to receive the blows of a hammer or other tool employed to force said ring and the work disposed below it from the mandrel.

A piece of suitable size and shape from a bar or plate of metal is first formed into a cylinder as shown at Fig. 4, open on one side, as at 13. The same is then heated to the required degree and placed in the flared upper end of the bore of the die or former. The flared upper end of the die bore enables the work to be readily inserted and removed. The mandrel is then placed in the bore of the work, as shown in Fig. 1, and driven down into the die or former by steam or other power, and caused to carry the work with it and to subject the work to such pressure as to weld its ends together and cause the work to conform to the shape and form of the lower portion of the bore of the die or former and of the lower portion of the mandrel, as shown in Fig. 2. The mandrel is then withdrawn from the die or former, taking the work with it, and the work is then removed from the mandrel by striking downwardly on the laterally projecting ledge of the false ring 12, to start said ring and cause it to dislodge the work.

From the foregoing description, taken in connection with the accompanying drawings, the construction and operation of the invention will be readily understood without requiring a more extended explanation.

Having thus described my invention, what I claim as new and desire to secure by Letters-Patent is;—

In a forming device of the character described, comprising a die, having a ring fitted in the lower end thereof so as to provide an air passage, a mandrel having a head with an overhanging angular shoulder, a ring adapted to contact with the shoulder and extending laterally beyond said shoulder, the lower portion of the mandrel being constructed cylindrical and provided with a surrounding shoulder and having a reduced portion leading downwardly from the surrounding shoulder, substantially as specified.

In testimony whereof I have hereunto set my hand in presence of two subscribing witnesses.

WM. A. SPARKS.

Witnesses:
R. BOLARD, Jr.,
CLYDE B. JOHNSON.